Patented July 28, 1931

1,815,985

UNITED STATES PATENT OFFICE

ERNST PANSEGRAU, OF KREFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR THE MANUFACTURE OF OXYGENATED ORGANIC COMPOUNDS

No Drawing. Application filed June 18, 1929, Serial No. 371,959, and in Germany June 19, 1928.

The present invention relates to the oxidation of alkyl substituted benzenes and their halogenated derivatives by means of molecular oxygen or gases containing oxygen. It particularly relates to a process in which the oxidation is carried out under superatmospheric pressure in the presence of a liquid aqueous phase and of an oxidation catalyst.

I have found that alkyl substituted benzenes and their halogenated derivatives, for example, toluene, xylene, ethyl benzene, chloro toluene and the like, are readily oxidized by reacting upon them with molecular oxygen or gases containing oxygen under conditions of elevated temperature and superatmospheric pressure in the presence of a substantial proportion of water and of a small quantity of an oxidation catalyst. In carrying out the oxidation in this manner the presence of an alkaline or other acid-binding agent may be dispensed with. Under the aforesaid conditions oxidation generally proceeds moderately and the primary products of oxidation, which otherwise are easily attacked by further oxygen, may be isolated. By varying the temperature and the duration of the oxidation and by graduating the amount of water added to the reaction mixture, the effect of oxidation, i. e. the species of oxygenated compounds resulting, is influenced to a large extent. An increasing ratio of water, in particular, has the effect of moderating the oxidation. In general I use at least three parts by weight of water for each part of the substance to be oxidized.

Another means of moderating the action of oxygen consists in adding a considerable amount of carbon dioxide to the gas containing oxygen.

The oxidation catalysts employed which are essential to the process may be of different kinds. Oxidic compounds of heavy metals (i. e. metals having a specific gravity of 5 and over) especially oxides and hydrated oxides thereof have given excellent results. The state of division of the oxidation catalyst is however, of great importance, since a more finely divided oxidation catalyst offering a larger surface exerts a greater action. Among the catalysts which have been found suitable in carrying out the invention, the following may be named: copper oxide, copper hydroxide, nickel oxide, nickel hydroxide, cobalt oxide, cobalt hydroxide, iron oxide, iron hydroxide, manganese oxide, cerium oxide, osmium oxide, vanadium oxide. The iron oxides, especially the hydrated oxides, such as the semi hydrate corresponding to the formula $FeO.OH$, are particularly appropriate in most cases. These oxidation catalysts may be used singly or mixed with one another; for example ferric oxide mixed with a small quantity of another oxidation catalyst, such as mixtures of hydrated ferric oxide with chromium oxide, uranium oxide, copper oxide, cerium oxide, zinc oxide or the like, are especially suitable.

One preferred method of carrying out my process consists in introducing the substance to be oxidized, water and the oxidation catalyst into an acid- and pressure-proof vessel provided with a stirring device, heating the mixture to the reaction temperature and then forcing gaseous oxygen or a gas containing oxygen, for example, air, into the vessel until the desired amount of oxygen has been absorbed. If desired or necessary, the escaping gases are cooled down under superatmospheric pressure and thereupon allowed to expand. The reaction temperature depends upon the compound to be oxidized; it lies in all cases above 150° C. and is regulated in such a manner that the vapor tension of the organic compound is high enough to form a mixture of vapor and oxygen in the vapor space the composition of which lies beyond the limits known for explosive hydrocarbon vapor-oxygen mixtures, i. e. that the vapor-oxygen mixture contains considerably more vapor than any ignitable or explosive mixture. Moreover the presence of water in the reaction mixture diminishes the possibility of forming explosive gas mixtures.

My invention is illustrated by the following examples, but is not restricted thereto. The parts are by weight.

Example 1

An iron autoclave provided with a stirring device and a reflux condenser is charged with 150 parts of toluene, 1500 parts of water and 5 to 10 parts of hydrated ferric oxide having the composition FeO.OH. The mixture is heated to 235 to 240° C. and oxygen is led into it for 1½ to 2 hours, the total pressure being 50 to 60 atmospheres. After cooling down, sodium carbonate is added; steam is introduced and from the distillate the unchanged toluene is removed by means of fractional distillation. The residue yields benzaldehyde, besides traces of benzyl alcohol and dibenzyl ether. Some benzoic acid is furthermore obtained by acidulating the sodium carbonate solution remaining after the distillation by steam.

*Example 2*

400 parts of toluene, 1500 parts of water and a mixture of 4 parts of hydrated ferric oxide FeO.OH and 1 part of uranium oxide are treated with oxygen at a temperature of about 225° and under a total pressure of about 60 atmospheres for four hours, as shown in Example 1. After adding sodium carbonate sufficient to neutralize all the acid present, the reaction mixture is worked up by distillation by means of steam. The portion distilling with steam contains in addition to unchanged toluene some benzaldehyde (besides traces of benzyl alcohol and dibenzyl ether); the residue yields 200 parts of benzoic acid.

*Example 3*

250 parts of toluene, 1500 parts of water and 5 parts of ferric oxide (obtained from a ferrous chloride solution by precipitating ferrous hydroxide, oxidizing it and calcining the precipitate at about 700° C.) are treated with air at a temperature of about 230° C. and under a total pressure of about 70 atmospheres (analogous to Example 1). Working up in accordance with Examples 1 and 2 yields unchanged toluene, benzaldehyde and benzoic acid.

*Example 4*

5 atmospheres of carbon dioxide are forced into an autoclave containing a mixture of 400 parts of toluene, 1500 parts of water and 4 parts of hydrated ferric oxide FeO.OH at normal temperatures. Then the autoclave is heated to 220° C. and oxygen forced into the heated mixture until a total pressure of 60 atmospheres is attained. The residual gas is discharged through a throttling valve at such a rate that the escaping gas contains about 30 percent of carbon dioxide.

After 3 hours the content of the autoclave is allowed to cool down and worked up as shown in the foregoing examples. In addition to unchanged toluene and some benzaldehyde there is obtained as a main product benzoic acid of particular purity.

*Example 5*

500 parts of p-xylene, 1500 parts of water and 2 parts of hydrated ferric oxide FeO.OH are treated with oxygen at a temperature of about 235° C. and under a total pressure of about 60 atmospheres for 3½ hours. Working up (analogous to Example 1) yields in addition to unchanged p-xylene 60 parts of p-toluic aldehyde and 120 parts of p-toluic acid.

*Example 6*

500 parts of m-xylene, 500 parts of water and 5 parts of vanadium pentoxide are heated to a temperature of about 220° C. whilst forcing oxygen into the reaction mixture for 5 hours, the total pressure being 30 to 40 atmospheres. Equal amounts of m-toluic aldehyde and m-toluic acid are obtained (besides traces of isophthalic acid).

*Example 7*

500 parts of ethyl benzene, 500 parts of water and 5 parts of hydrated ferric oxide are treated with oxygen at a temperature of 170° C. and under a total pressure of about 20 atmospheres for 2 hours. Working up yields 110 parts of a mixture consisting of about 30 percent of phenyl methyl carbinol and 70 percent of acetophenone, besides some benzoic acid.

*Example 10*

200 parts of p-chloro toluene, 1500 parts of water and 2 parts of hydrated ferric oxide FeO.OH are treated with oxygen at a temperature of about 230° C. and under a total pressure of about 50 atmospheres for 3 hours. Working up as in the foregoing examples yields 20 parts of p-chloro benzaldehyde and 80 parts of p-chloro benzoic acid.

I claim:

1. A process which comprises reacting upon an alkyl substituted benzene which may be further substituted by halogen with a gas containing oxygen under conditions of elevated temperature above 150° C. and superatmospheric pressure in the presence of a liquid aqueous phase and an oxidation catalyst comprising an oxidic compound of a heavy metal.

2. A process which comprises reacting upon an alkyl substituted benzene which may be further substituted by halogen with a gas containing oxygen at temperatures between 170° C. and 240° C. and pressures between 20 and 70 atmospheres in the presence of a liquid aqueous phase and an inorganic oxidation catalyst comprising an oxidic compound of iron.

3. A process which comprises reacting upon an alkyl substituted benzene which may be further substituted by halogen with a gas containing oxygen at temperatures between 170° C. and 240° C. and pressures between 20 and 70 atmospheres in the presence of a liquid aqueous phase and an inorganic oxidation catalyst comprising a hydrated ferric oxide.

4. A process which comprises reacting upon alkyl substituted benzene which may be further substituted by halogen with a gas containing oxygen at temperatures between 170° C. and 240° C. and pressures between 20 and 70 atmospheres in the presence of a liquid aqueous phase and an inorganic oxidation catalyst comprising a semihydrate of ferric oxide.

5. A process which comprises reacting upon toluene with a gas containing oxygen under conditions of elevated temperature above 150° C. and superatmospheric pressure in the presence of a liquid aqueous phase and an inorganic oxidation catalyst comprising a hydrated ferric oxide.

6. A process which comprises reacting upon toluene with oxygen at a temperature of about 225° C. and under a pressure of about 60 atmospheres in the presence of at least three parts water for each part of toluene and of semihydrate of ferric oxide having the composition $FeO.OH$.

7. A process which comprises reacting upon an aromatic hydrocarbon with a gas containing oxygen under conditions of elevated temperature above 150° C. and superatmospheric pressure in the presence of a liquid aqueous phase, carbon dioxide and an oxidation catalyst comprising an oxidic compound of a heavy metal.

8. A process which comprises reacting upon an alkyl substituted benzene which may be further substituted by halogen with a gas containing oxygen under conditions of elevated temperature above 150° C. and superatmospheric pressure in the presence of a liquid aqueous phase and an oxidation catalyst comprising an oxidic compound of iron.

9. A process which comprises reacting upon an alkyl substituted benzene which may be further substituted by halogen with a gas containing oxygen at temperatures between 170° C. and 240° C. and pressures between 20 and 70 atmospheres in the presence of a liquid aqueous phase and an inorganic oxidation catalyst comprising an oxidic compound of a heavy metal.

In testimony whereof I have hereunto set my hand.

ERNST PANSEGRAU.